Oct. 18, 1960  H. T. WESTERHEIM  2,956,431
DENSIMETER
Filed June 28, 1957  6 Sheets-Sheet 1

Harold T. Westerheim,
Inventor.
Koenig and Pope,
Attorneys.

Oct. 18, 1960   H. T. WESTERHEIM   2,956,431
DENSIMETER
Filed June 28, 1957   6 Sheets-Sheet 2

Harold T. Westerheim,
Inventor.
Koenig and Pope,
Attorneys.

Oct. 18, 1960  H. T. WESTERHEIM  2,956,431
DENSIMETER

Filed June 28, 1957  6 Sheets-Sheet 5

FIG. 9.

Oct. 18, 1960  H. T. WESTERHEIM  2,956,431
DENSIMETER
Filed June 28, 1957  6 Sheets-Sheet 6

FIG.10.

Harold T. Westerheim,
Inventor.
Koenig and Pope,
Attorneys

United States Patent Office 2,956,431
Patented Oct. 18, 1960

2,956,431
DENSIMETER

Harold T. Westerheim, Garland, Tex., assignor, by direct and mesne assignments, of one-half to Foster M. Poole and one-half to Carl Casey, both of Dallas, Tex.

Filed June 28, 1957, Ser. No. 668,677

11 Claims. (Cl. 73—32)

This invention relates to densimeters, and more particularly to a densimeter for measuring the densities of fluids.

Among the several objects of the invention may be noted the provision of a dependable densimeter for accurately and continuously indicating the densities of fluids, both liquid and gaseous; the provision of a density meter in which the density indicated is corrected or compensated for nonstandard temperature and pressure-induced density variations; the provision of apparatus of the class described which is substantially unaffected by externally applied mechanical vibrations, shock and the like; the provision of a densimeter which will accurately indicate fluid density values on an A.P.I. scale and wherein the fluid density may be affected by temperature and pressure variations; and the provision of a densimeter of this class which is adaptable to density indicating and control purposes. Other objects and features will be in part apparent and in part pointed out hereinafter.

The invention is an improvement upon the apparatus shown in U.S. Patents 2,635,462 and 2,754,676.

The invention accordingly comprises the constructions hereinafter described, the scope of the invention being indicated in the following claims.

In the accompanying drawings, in which one of various possible embodiments of the invention is illustrated.

Corresponding reference characters indicate corresponding parts through the several views of the drawings.

In order to determine accurately the density of fluids, it is important that the density measuring device be insensitive to externally applied mechanical vibration, shock and the like, and also that the effects of nonstandard temperature and pressure-induced density variations be corrected and compensated. The densimeter of the present invention includes a hollow vibratory mechanical system which, when filled with fluid (liquid or gaseous), has a natural frequency of resonance that is a function of the fluid density and which is unaffected by externally applied mechanical vibrations and shock. Moreover, the apparatus of the present invention accurately indicates the density of the fluid in degrees A.P.I., regardless of temperature and pressure variations of the fluid from standard A.P.I. conditions (60° F. and 0 p.s.i.).

Referring now more particularly to Figs. 1–6, S shows in general a novel mechanical assembly which will first be described. This comprises a base 1 to which is attached a vertical plate 3 (see attachments 5). Bolted to the plate 3 is a rectangular framework F (see bolts 7). This framework is constituted by vertical side legs 9 and 11 and transverse top and bottom headers 13 and 15, respectively. The top header is composed of a plate 17, bolted to the vertical leg 9, as shown at 19. It is also bolted to the vertical leg 11, as shown at 21, a filler block 23 being employed as part of the latter connection.

Figure 1:
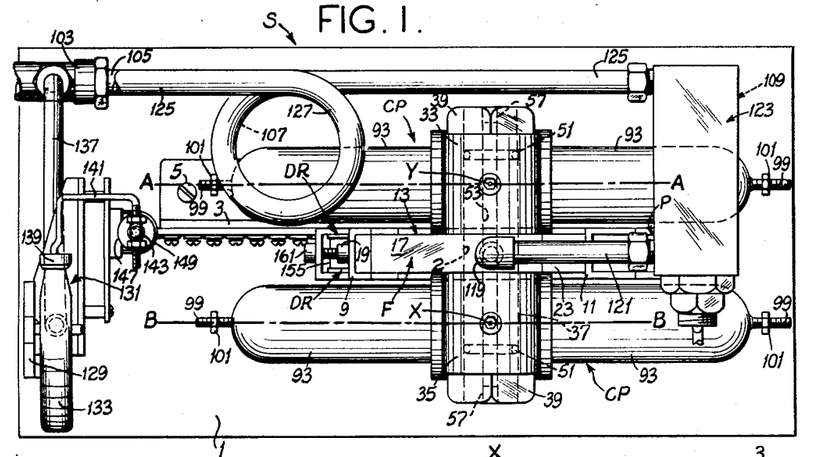
Fig. 1 is a top plan view primarily of a mechanical assembly of certain vibratory parts of the invention.
Figure 2:
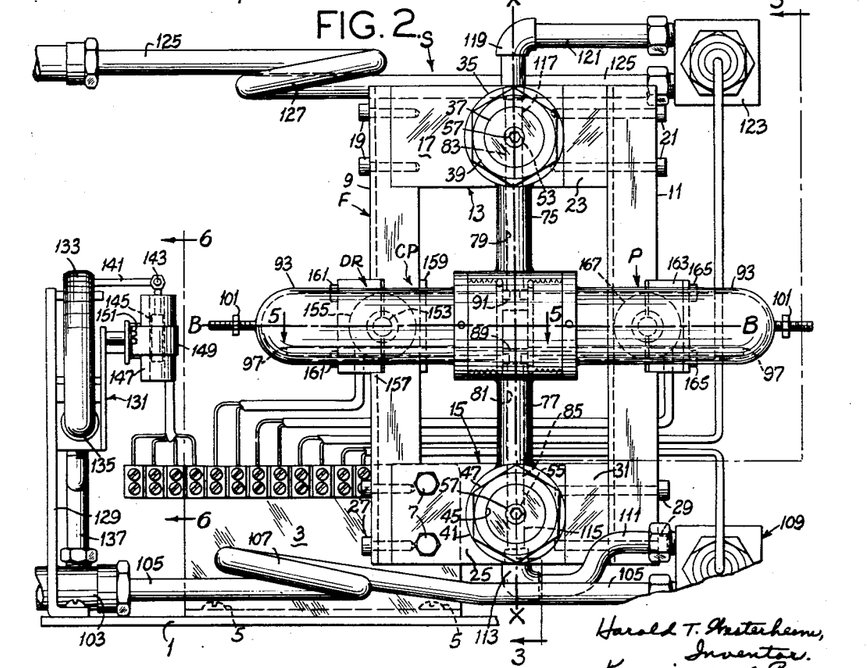
Fig. 2 is a front elevation of Fig. 1.

The lower header 15 is composed of a plate 25 to which is bolted the vertical leg 9, as shown at 27. Plate 25 is also attached to the vertical leg 11, as shown at 29, a filler block 31 being also employed at this attachment. As shown in Fig. 2, said bolts 7 which hold the frame to the plate 3 pass through the lower plate 25.

Attached on opposite sides of the upper plate 17 are sleeves 33 and 35, this being accomplished by a hollow drawbolt 37 having nuts 39 threaded to its opposite ends. Between sleeves 33 and 35, plate 17 is provided with an opening 2. Likewise, attached on opposite sides of the lower plate 25 are sleeves 41 and 43, this being accomplished by a hollow drawbolt 45 having nuts 47 threaded to its opposite ends. Between sleeves 41 and 43, plate 25 is provided with an opening 4. Suitable packing is used between the inner faces of sleeves 33, 35 and the plate 17; also between the inner faces of the sleeves 41, 43 and plate 25. Examples of these are shown at numerals 49 at the bottom of Fig. 3. Packings 51 are also employed between the bolts 37 and 45 and their sleeves 33, 35 and 41, 43, respectively.

The bolts 37 and 45 are hollow, having axial passages therein as shown at 53 and 55, respectively. These passages are provided with end plugs 57. Midway between the sleeves 33 and 41 is a transverse sleeve 59, connected with sleeve 33 by means of an upper tube 61 and with sleeve 41 by means of a coaxial lower tube 63. The passages in tubes 61 and 63 are shown at numerals 65 and 67, respectively. Cross connections 69 and 71 in the bolts 37 and 43 connect these passages 65 and 67 with the cross passages 53 and 55, respectively, in the bolts. Midway between sleeves 35 and 43 is a transverse sleeve 73, connected with sleeve 35 by means of a tube 75 and with sleeve 43 by means of a tube 77. The passages in tubes 75 and 77 are shown at 79 and 81, respectively. Cross connections 83 and 85 in the bolts 37 and 45 connect these passages 79 and 81 with the cross passages 53 and 55 in the bolts.

Figure 4:
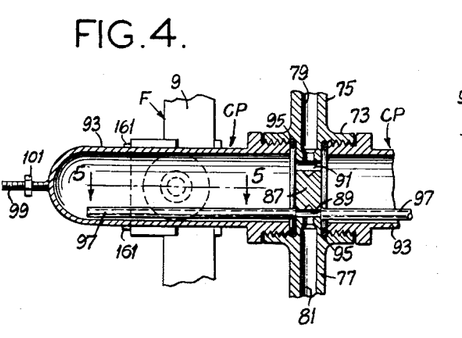
Fig. 4 is a fragmentary vertical section taken on line 4—4 of Fig. 3.

The sleeves 59 and 73 are constructed the same, and it will therefore be sufficient to describe one of them, namely, sleeve 73, shown in Fig. 4. Each is provided with a central divider 87, having lower and upper transverse ports 89 and 91, respectively, for connection with the lower and upper passages 81 and 79 (for example on Fig. 4). Threaded into the sleeve on opposite sides of the diaphragm 87 are the bases of ferromagnetic, rigid, elongate vessels or vials 93, suitable packing being employed as shown at 95. In the bottom of each vessel 93 is a feed pipe 97, a pair being connected at opposite ends of each lower passage 89. By this means, fluid may be brought into the lower port 89 and distributed to the opposite heads of the vessels 93, from whence the fluid flows back from each vessel through port 91 and thence upward. The outer head end of each vessel 93 is provided with a threaded extension 99 on which is threaded an adjustable nut 101. Each of the two opposed pairs of vessels 93 constitutes a capsule CP.

Figure 3:
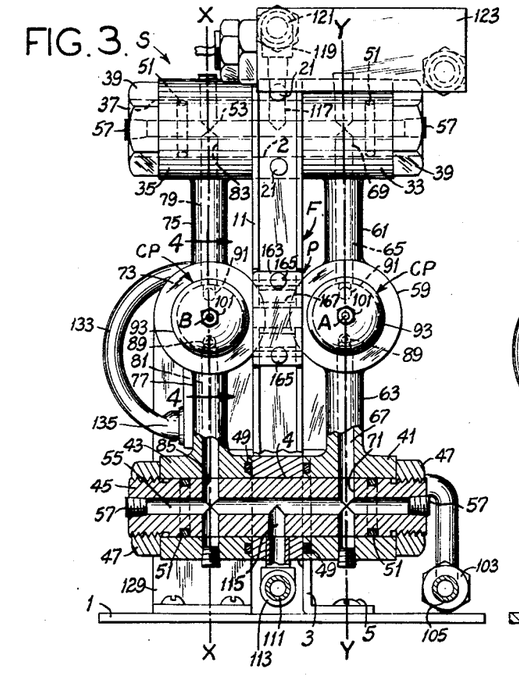
Fig. 3 is a left-end elevation, partly in section, as viewed on line 3—3 of Fig. 2.

Fluid is brought into the apparatus through an inlet pipe and fitting 103, thence over a lower pipe 105, which includes a flexing loop 107, and then through a lower electric resistance thermometer assembly 109, which, being conventional, requires no further description. The fluid leaves the assembly 109 via pipe 111, entering the bottom of the plate 25 through a fitting 113. It finds its way into the lower cross passage 55 in lower bolt 45 through a cross bore 115 (Fig. 3). Thus the flow is divided, for subsequent rise substantially equally through the sleeves 59 and 73 into the capsules CP and ultimately into the cross passage 53 of the upper bolt 37. It then finds its way out of this cross passage through a central cross bore 117, fitting 119, and pipe 121 leading to a second (upper) resistance thermometer assembly 123. It leaves this assembly 123 over outlet pipe 125, the latter having in it a flexing loop 127.

The base 1 carries a second support 129 for an assembly 131 including a Bourdon pressure-responsive tube 133. The anchored end 135 of the tube 133 has a fluid connection with a cross pipe 137 which leads to the inlet fitting 103. The relatively free end 139 of the Bourdon tube moves more or less vertically in response to internal static pressure changes in the tube 133. By means of a crossarm 141 the Bourdon tube end 139 is connected at 143 with a ferromagnetic core or armature 145, movable within a hollow multiple winding differential transformer 147. When the fluid pressure rises, this is transmitted through pipe 137 to the Bourdon tube 133, thus elevating its free end 139 and through arm 141 and connection 143 elevating the core 145. Conversely, when the pressure drops, the core descends. The significance of this action will appear below.

The transformer 147 is held in place by a hold-down strap 149. By adjusting the position of 147 in the strap 149, the position of the multiple windings thereof relative to core 145 may be adjusted. Screws 151, holding the strap, may be loosened for the purpose. It will be understood that other and more refined means may be employed for adjusting the relative positions between coil 147 and the core 145; but further description will not be required, since there are many conventional adjustments available in the art for the purpose.

Figure 5:
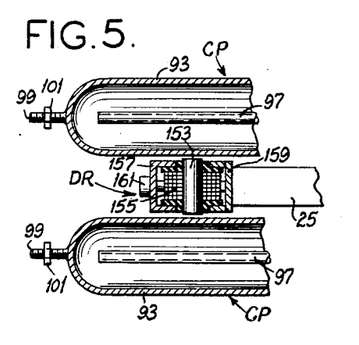
Fig. 5 is a fragmentary horizontal section taken on line 5—5 of Fig. 2.
Figure 6:
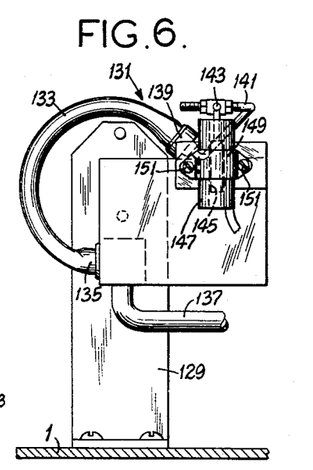
Fig. 6 is a cross section taken on line 6—6 of Fig. 2.

In Fig. 5 is shown an electromagnetic driver unit DR, consisting of an insulated ferromagnetic core 153, around which is wound a coil 155. These parts are set into a recess in the leg 9 and clamped thereto by clamping members 157 and 159 (see drawbolts 161).

At P is shown a similar unit which serves as a signal pick-up unit. A clamping member 163, drawn toward the leg 11 by means of bolts 165, holds on the leg 11 an armature and coil assembly 167, which constitutes the pick-up coil P. Further description of this pick-up coil P will not be required, since it is electrically the same in form as driver unit DR. As indicated in the drawings, the driver unit DR and the pick-up coil assembly P are located substantially in the plane of the capsules CP.

When the driver DR is electrically excited, as will be described below, it alternately drives apart and attracts together the adjacent ends of the rigid ferromagnetic capsules CP (Fig. 5). Consequently, the rigid capsules alternately move away from one another and toward one another at the pick-up coil P, thus affecting it electrically in the manner to be described. At the same time the sleeves 59 and 73 apply twisting torque to the tubes 61, 63 and 75, 77 respectively, engendering twisting restorative forces. The purpose of the nuts 101 is to adjust the moments of inertia of the capsules CP for equality of rotary system moments about the axes X—X and Y—Y of the pairs of tubes 77, 79 and 61, 63, respectively.

Complete mechanical operation of the parts shown in Figs. 1–6 is as follows, assuming that the driver coil assembly DR is electrically excited with A.C. and that fluid to be tested is introduced into the apparatus through the fitting 103. This fluid will be under some given temperature and pressure. Static pressure is transmitted through pipe 137 to Bourdon tube 133, thus responsively positioning the core 145 with respect to the coil 147. The pressure drives the fluid through the lower resistance thermometer assembly 109, thence through pipe 111 and fitting 113 (Fig. 2), passage 115 (Fig. 3), into the cross bore 55 and up along the axes X and Y. In the process, each of the two flows along the axes X and Y splits at lower passage 89 (Fig. 4), passing through opposite vessels 93 on the same sleeve 59 or 73 (as the case may be), thence rejoining at passage 91 and proceeding up to the cross bore 53, through passage 117 to the resistance thermometer assembly 123 and finally out through pipe 125. The driver DR vibrates the paired capsules on the axes X—X and Y—Y, respectively, in opposite angular directions at their natural frequency of resonance. Unlike the structure shown in said Patent 2,754,676, no spring-mounted inertial system or frame is required between the vibrating system and its framework connected to the earth. This is because of the paired twin capsule arrangement on axes X—X and Y—Y, as shown in Fig. 3, and the parallel arrangement of the transverse axes A—A and B—B of the capsules, the driver DR and pickup P being interposed between them on axes A—A and B—B. Thus even though the mechanical system may be subjected to direct application of environmental vibrations, shocks and the like, these are not translated into variations in respect to electrical functions of the driver DR or pick-up P. This is because while such variations, shocks and the like are imposed on the vibrating system, the net effect thereof on the electrical variables is algebraically cancelled, i.e., always zero. This advantageous result is accomplished without the necessity for the spring mounted protective apparatus shown in said Patent 2,754,676.

The capsules CP differ from the flexible tubes 3 and 5 of Patent 2,635,462 in that the capsules herein are rigid and do not have their natural frequency of vibration affected by internal pressure changes. It will be understood in this regard that, since the sleeves 59 and 73 and vessels 93 are rigid, all flexing due to vibration is limited to twist in the tubes 61, 63, 75 and 77, and that the restorative twisting forces are independent of the internal pressure; unlike the case in Patent 2,635,462, wherein the restorative forces are affected to some extent by variations in the internal pressure if these changes are substantial. Thus the present mechanical construction provides means for obtaining vibratory action at a natural frequency of resonance substantially unaffected even by large pressure variations of the fluid transmitted or locations subjected to substantial externally applied vibrations and shock.

Figure 7:
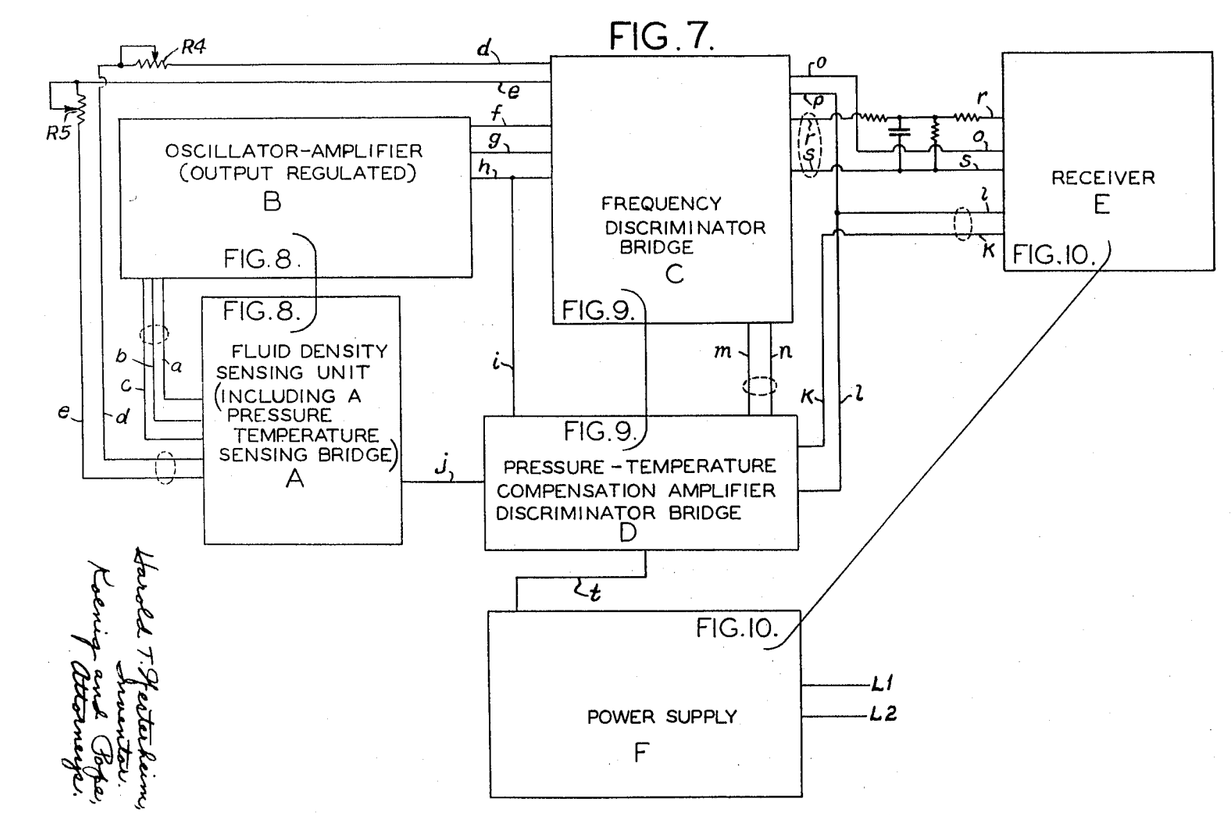
Fig. 7 is a block diagram of the various electronic units of the present invention, illustrating their interconnection.
Figure 8:
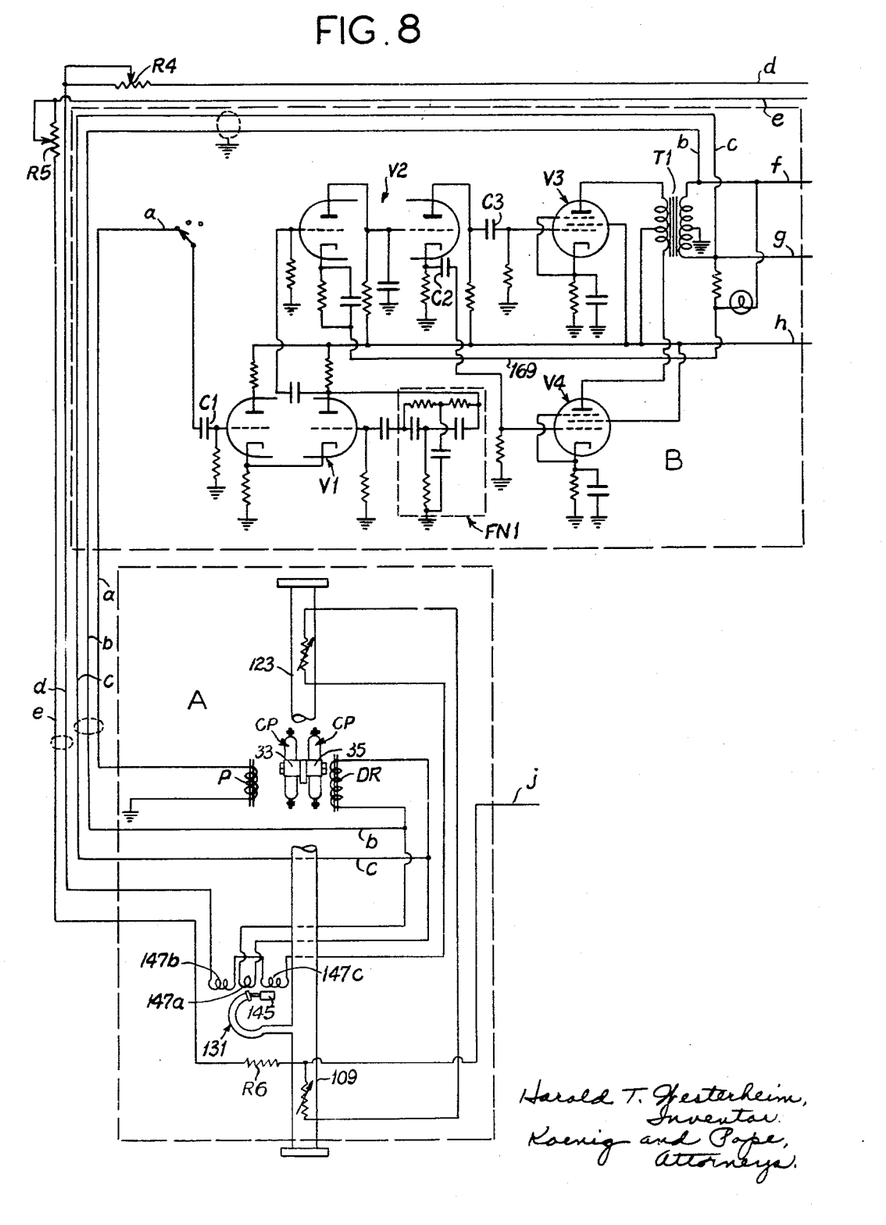
Figs. 8–10 are circuit diagrams of the various electronics units shown in Fig. 7.
Figure 9:
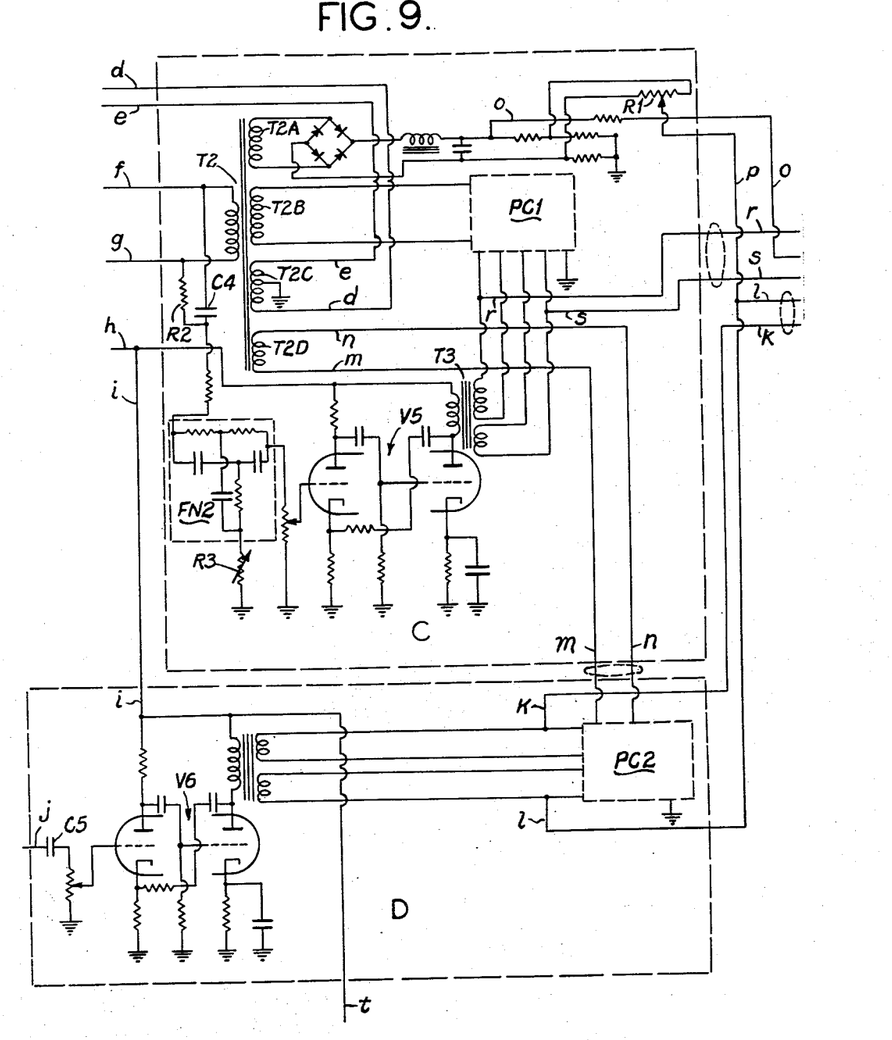
Figure 10:
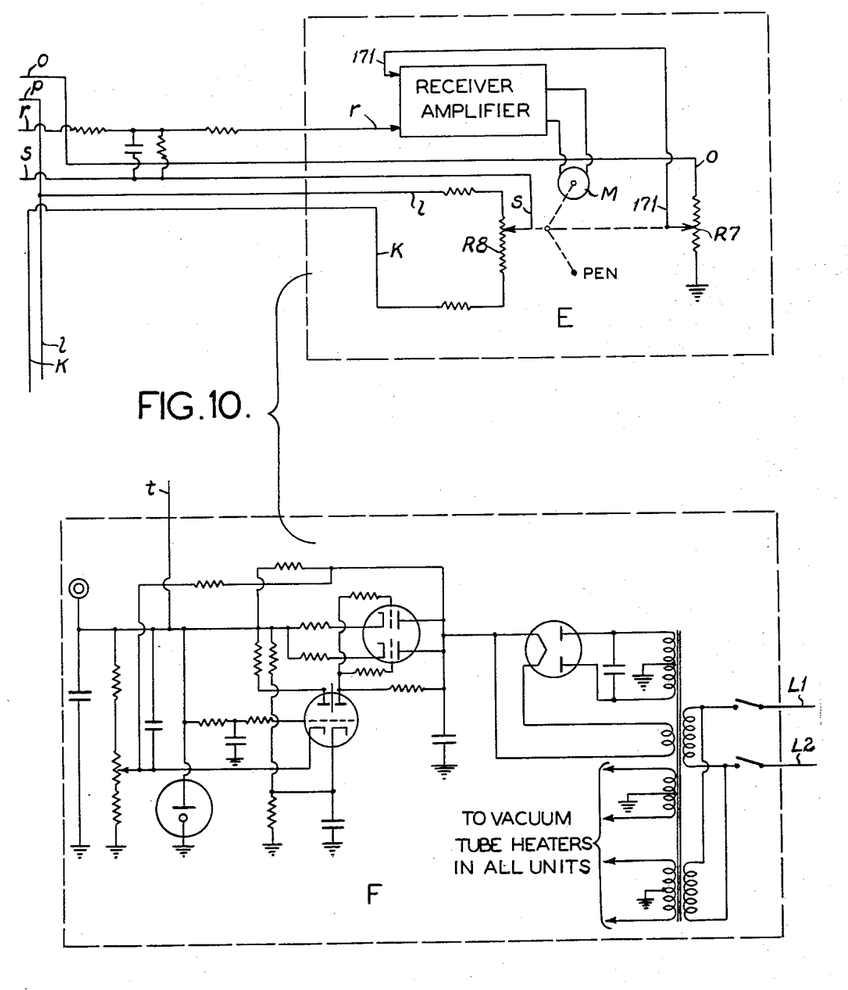

Referring now to Fig. 7, the various electronic units are shown, which function to (1) maintain the oscillation of the capsules CP at the natural frequency of resonance (as determined by the density of the contained fluid), (2) convert the electrical signal from pick-up P to a control voltage or visual indication of fluid density, and (3) compensate the above voltage or indication automatically for nonstandard fluid temperature and pressure variations. Unit A (cf. Fig. 8) includes the twin capsules, the driver and pick-up units, the pressure-responsive assembly 131 and the resistance thermometer assemblies 109 and 123. It is interconnected by an electric cable having three conductors or wires $a$, $b$ and $c$ to an oscillator-amplifier unit B which amplifies the oscillatory signal of pick-up P and supplies the driving energy to driver unit DR. A second cable with two conductors $d$ and $e$ connects unit A to a unit C which converts the A.C. oscillatory signal to a D.C. signal which is a function of the capsules' natural oscillatory frequency. Unit C is also interconnected by wires $f$, $g$ and $h$ to unit B and by a wire $i$ to a unit D, which serves to provide a D.C. pressure and temperature-compensating signal, via conductors $k$ and $l$, to unit E.

Unit D has common connections to unit A through a wire $j$, and to unit C via a pair of conductors $m$ and $n$. The frequency discriminator bridge unit C additionally has reference voltage outputs via wires *o* and *p* to receiver unit E and a D.C. signal output by means of conductors *r* and *s* to receiver E. Receiver E converts the two D.C. frequency responsive signals (wires *r* and *s*, and wires *k* and *l*, respectively) and the D.C. reference signals (conductors *o* and *p*) to a visual and recorded indication of fluid density. Unit F, which provides a regulated B+ voltage to the various electronic units, is interconnected by wire *t* to unit D. Power for unit F is supplied at L1 and L2 from any conventional source of A.C. power.

The signal from the transducer or pick-up unit P (wire *a* and ground) is capacitively coupled by a condenser C1 to a grid of a duo-triode vacuum tube V1. The A.C. ouput of the tube is filtered by a narrow band pass twin-T filter network FN1. The amplified and filtered signal from pick-up P is fed to three additional cascaded amplifier stages, including each of the two sections of a duo-triode V2 and the push-pull power amplifier stage constituted by pentodes V3 and V4. The 180° out-of-phase grid signals for V3 and V4 are provided via condensers C2 and C3 from the second stage of V2 by utilizing plate and cathode follower outputs thereof. An output transformer T1 is interconnected by wires *b* and *c* to the driver transducer DR thus forming an oscillatory circuit, the oscillation frequency of which is the natural frequency of oscillation of the torsionally counter-vibrating 180° mutually out-of-phase fluid-filled capsules. The same A.C. output signal of unit B is coupled (wires *f* and *g*) to the primary of an input transformer T2 of unit C. This A.C. output signal of unit B is also fed back via a wire 169 to provide a heavy inverse feedback to the cathode of the first section of tube V2, thus supplying a well regulated and stable output signal from unit B. The D.C. potential for the plate supply of unit B is provided by wire *h*.

A first secondary winding T2A of the input transformer T2 of the frequency discriminator bridge unit C is connected in a bridge rectifier circuit. A receiver-balancing reference potential (wire *o*) and an adjustable D.C. calibrating potential (wire *p*), which serves as a means of calibration of the compensation output of unit D, are thereby supplied to receiver unit E. A second secondary winding T2B is connected to an input of a diode phase comparator PC1. A third secondary T2C provides an A.C. energizing voltage to the pressure-temperature bridge via wires *d* and *e*. A fourth secondary T2D supplies (via *m* and *n*) an A.C. reference input signal to a second diode phase comparator PC2 (in unit D). A second twin-T filter network FN2 is interconnected between the junction of an RC circuit (resistor R2 and condenser C4 shunted across the primary of T2) and a control grid of a first section of duo-triode vacuum tube V5. The second section of V5 is coupled via a dual secondary output transformer T3 to phase comparator PC1. The transformer winding T2B and the wire interconnecting the junction of R2—C4 to network FN2 supply two input signals to frequency discriminator bridge C and thereby effectively constitute first and second outputs of the regenerative amplifier unit B. Similarly, secondary winding T2D and the rectified D.C. potential of winding T2A, which are respectively connected and supply output signals to the pressure temperature discriminator bridge D and receiver E, effectively constitute third and fourth outputs of unit B.

The phase comparator PC1 thus has two input A.C. signals, the first or reference A.C. signal from winding T2B and the second from the secondaries of transformer T3. The latter signal is derived from the action of the twin-T FN2 which has an input signal 90° out of phase relative to the reference signal due to the R2—C4 circuit. FN2 functions to impress a signal voltage on the first grid of V5 which signal is shifted in phase (±90°) and varied in amplitude relative to that of the reference signal from T2B. The phase shift and amplitude variation of this twin-T output signal is a function of the deviation of the natural resonant frequency of the filled capsules from a predetermined reference frequency. This reference frequency can be preset by variation of the rheostat R3. The phase comparator PC1, which comprises a full-wave diode phase comparison circuit, has a D.C. output signal which is dependent on the relative amplitude and phase differences between the reference signal from T2B and the amplified twin-T output signal from T3. Thus, the amplitude of the D.C. output signal transferred to the receiver unit E via wire *r* and ground, augmented algebraically by the output of the pressure-temperature compensation phase comparator PC2 via wires *s*, *k*, *l* and ground through a calibrating adjustable resistor R1 (biased by reference voltage *o*) is precisely proportional to the deviation of the capsules' instantaneous natural resonant frequency from the desired predetermined reference frequency preselected by rheostat R3.

It will be noted that the receiver reference voltage (wire *o*), PC2 output calibrating voltage (wire *p*), and the algebraic sum of the D.C. outputs of PC1 and PC2 (wire *r*), are unaffected by line voltage variations, or other variations, because they are both a function of a common signal, i.e., the input signal to the primary of transformer T2. The same advantage accrues in regard to the reference signal to comparator PC2 (secondary T2D) and to the energizing of the pressure-temperature sensing bridge (secondary T2C). Thus, as each of these four outputs from these transformer secondaries is derived from a common signal source, the circuitry of the present invention is self-correcting.

A novel system for pressure-temperature compensation is provided by the unit D in combination with the pressure-temperature sensing bridge components of unit A. The A.C. signal which is impressed on driver DR (wires *b* and *c*) is also connected across a central winding or primary 147*a* of differential transformer 147. Two other windings or secondaries 147*b* and 147*c* are connected in a series circuit (via wires *d* and *e*) with two rheostats R4 and R5, a fixed resistor R6, and the two resistance thermometers 123 and 109. This series loop circuit constitutes an A.C. bridge, one leg of which includes one half of the center-tapped to ground secondary T2C, R4, the secondaries 147*b* and 147*c* and the two resistance thermometers 109 and 123; and the other leg of which is made up of rheostat R5 and fixed resistor R6. The bridge output is capacitively coupled (via wire *j*) by a condenser C5 to a control grid of a two-stage duo-triode amplifier V6 in the pressure-temperature compensating amplifier-discriminator bridge unit D.

The pressure-temperature sensing bridge in unit A is calibrated to a null point at 60° F. and 0 p.s.i. Any deviation in pressure from standard results in a variation in amplitude of the sensing bridge output due to a modified coupling between the primary 147*a* and the secondaries 147*b* and 147*c*. Any deviation in temperature from standard causes a phase shift in the sensing bridge output. Thus, the signal to comparator PC2 (as amplified by V6) differs in phase and magnitude from that fed to PC1 by V5 only in proportion to any nonstandard pressure and temperture conditions of the fluid being tested. As the reference signal fed to PC2 by wires *m* and *n* is identical to that fed to PC1 by T2B, the output of PC2 (wires *k* and *l*) will be a D.C. signal differing only from the D.C. output signal from PC1 (wires *r* and *s*) as per any nonstandard pressure and temperature conditions.

Referring now to the receiver E, this unit comprises a receiver-amplifier component, a two-phase reversible positioning motor M, a receiver positioned feedback potentiometer R7 and a pressure-temperature coefficient correction potentiometer R8. The latter two potentiometers are mechanically coupled to a pen and motor M. The three D.C. input signals to unit E are accommodated as follows. The D.C. pressure-temperature compensated signal from unit D (wires *k* and *l*) is connected across R8, the movable arm of which is connected to wire *s* (in unit E wire *k*, slide-wire R8, wires *l* and *s* constitute a shunt across the PC2 output with a variable part of such shunted PC2 output connected in series between PC1 and ground through the calibrating voltage, wire *p*). Wire *r*, the other conductor carrying the D.C. output signal from comparator PC1, is connected to the input of the receiver-amplifier component. Thus, the two D.C. control signals, one temperature-pressure related (and proportioned by R8), are electrically connected in series. One end of their algebraic sum series-connection is further connected in series opposition with the calibrating voltage (wire *p*) before reaching ground and so determines the value of voltage (wire *r*) impressed on the input of the receiver amplifier component. This latter component includes a 60-cycle pulsator or chopper so that the receiver-amplifier output will energize one phase of motor M, the other of which is connected to a conventional A.C. source. A second input to the receiver-amplifier is provided by interconnecting the rotor of R7 thereto by a wire 171. The reference potential connected across R7 (wire *o* and ground) is proportioned by the motor-actuated positioning of R7 to control the feedback to the receiver-amplifier component. When the system is in balance, this feedback potential is equal and opposite in value to the other (and composite) D.C. input to the receiver-amplifier and the output thereof is zero. Any deviation in fluid density will change the latter input and energize the second phase of motor M, thus actuating it until the movement of the movable arm of R7 provides a balancing potential at the other receiver-amplifier input (via wire 171).

One of the important advantages of the present invention is the accurate temperature and pressure compensation or correction of the density indication on a scale calibarted in degree A.P.I. The effect of non-standard pressures and temperatures on the A.P.I. density readings is not linear and varies radically with the particular A.P.I. value being corrected at the particular instant. The proper correction can be precisely applied by simply winding a single nonlinear potentiometer card for potentiometer R8. As the movable arm of R8 is ganged to the shaft of motor M, this nonlinear compensation is automatically applied.

The last unit is the power supply unit F. Although this is illustrated as a regulated power supply providing a substantially constant plate voltage source to units D, C and A (wires *t*, *i* and *h*), it is not necessary that this be a regulated supply. As explained previously, variations in line and plate voltages etc. do not affect the density readings because of the single energy source (the primary of T2) that is used as the origin of the reference and control potentials.

Because the balance of the circuitry of the present invention and the function of the various components will be readily understood by those skilled in the art, the functional description and interconnection of every resistor, condenser, etc., has not been set forth. Likewise, as particular parameters of the components, tube types, etc., are a function of the range of fluid densities to be determined, and other standards that may be desired, and the selection thereof is well within the skill of those engaged in this art, the instant description has not been obscured with such details.

It will be understood that in addition to continuously indicating the fluid densities being determined and recording them, the receiver unit E may be connected to control a density modifying device, such as a plurality of valves and supplies of various mixtures of predetermined density that can be operated to correct the fluid density and maintain it substantially constant at a preselected value.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Apparatus for responding to the density of fluids substantially independently of their pressures and of external vibration and shock applied to the apparatus, comprising a pair of spaced elongate hollow substantially rigid capsules, said capsules having their axes substantially parallel and in a common plane, resilient mounting means for the capsules constituted by pairs of coaxial inlet and outlet pipes having transverse attachment on opposite sides of the central portions of the respective capsules and adapted for circulation of fluids through the capsules, the axes of said pairs of pipes being substantially parallel and in a plane normal to the plane of said axes of said capsules, means anchoring opposite ends of each pair of pipes to a frame, said capsules and contained fluid having a natural frequency of resonance, each of said pairs of inlet and outlet pipes being adapted to perform opposite torsional movements in response to vibratory movements of said capsules respectively, electric driving means located between the capsules for vibrating them simultaneously in opposite directions at a natural vibratory frequency of resonance whereby restorative forces are engendered substantially only by the twist in the pipes, and means for measuring the frequency of vibration as an indication of the density of the contained fluid.

2. Apparatus as set forth in claim 1, wherein said frequency-measuring means includes an electric pick-up element also located between said capsules.

3. Apparatus for responding to the density of fluids substantially independently of their pressures and of external vibration and shock applied to the apparatus, comprising a pair of spaced elongate capsules having their axes substantially parallel and in a common plane, each having a natural vibratory frequency of resonance equal to that of the other, resilient mounting means for the capsules constituted by pairs of coaxial inlet and outlet pipes connected to opposite sides of the central portions of the respective capsules and adapted for circulation of fluid through the capsules, the axes of said pairs of pipes being substantially parallel and in a plane normal to the plane of said axes of said capsules, a supporting frame having leg portions located between the capsules on opposite sides of said pipes, said leg portions respectively supporting electrical vibratory driving and pick-up means, the driving means adapted to vibrate said capsules simultaneously in opposite directions at a natural vibratory frequency of resonance whereby restorative forces are engendered substantially only by the twist in the pipes, said pick-up means being adapted to pick up a resulting signal from said vibrating capsules, said frame including means establishing transverse connections between the inlet pipes and outlet pipes respectively, supply means for carrying fluid to one transverse connection and outlet means for carrying fluid from the other, and electronic circuit means connected to said pick-up means adapted to measure the frequency of vibration as an indication of the density of the contained fluid.

4. Apparatus as set forth in claim 3, including resistance thermostatic elements positioned in heat exchange relationshsip with the fluid flowing through said supply and outlet means respectively, said thermostatic elements being electrically interconnected in said electronic circuit means and adapted in response to temperature changes in said fluid to modify electrically the frequency-measuring action of said electronic circuit thereby to compensate for any temperature-induced density variations.

5. Apparatus as set forth in claim 4, including a hydrostatic pressure connection with said supply means responsive to pressure of said fluid, a flexing member adapted to move in response to said hydrostatic pressure, and an electrical sensing unit electrically interconnected in said electronic circuit means and mechanically connected to said flexing member adapted to modify electrically the frequency-measuring action of said electronic circuit means to compensate for pressure-induced density variations.

6. Apparatus for measuring the density of fluids comprising a hollow vibratory mechanical system adapted to contain a fluid the density of which is to be determined, said system including a contained fluid having a natural vibratory frequency of resonance, an electric driver for mechanically vibrating at said natural resonant frequency said system including the contained fluid as a unit, electric pick-up means responding to the vibrations of said system including the fluid, a regenerative amplifying circuit connected between the pick-up means and the driver and feeding first and second outputs, a frequency discriminator circuit including a phase comparator and a phase shifting frequency sensitive filter network connected to said first and second outputs adapted to produce an output signal which is a function of the deviation of said natural resonant frequency from a predetermined standard frequency, and means responsive to said output signal to indicate the density of said fluid.

7. Apparatus for measuring the density of fluids comprising a hollow vibratory mechanical system adapted to contain a fluid the density of which is to be determined, said system including a contained fluid having a natural vibratory frequency of resonance, an electric driver for mechanically vibrating at said natural resonant frequency said system including the contained fluid as a unit, electric pick-up means responding to the vibrations of said system including the fluid, a regenerative amplifying circuit connected between the pick-up means and the driver and feeding first and second outputs, a frequency discriminator circuit connected to said first and second outputs adapted to produce a first output signal which is a function of the deviation of said natural resonant frequency from a predetermined standard frequency, temperature-responsive means in heat exchange relationship with said fluid and connected in a second circuit with said second output, said second circuit producing a second output signal which is a function of temperature-induced density variations of said fluid, and means responsive to the composite of said first and second output signals to indicate the density of said fluid corrected for any temperature-induced density variations.

8. Apparatus as set forth in claim 7 in which said second circuit further includes means responsive to the pressure of said fluid, and said second output signal is a function of both temperature and pressure-induced density variations of said fluid whereby the density indicated by said indicator means is thereby corrected for both temperature and pressure-induced density variations.

9. Apparatus for measuring the density of fluids comprising a hollow vibratory mechanical system adapted to contain a fluid the density of which is to be determined, said system including a contained fluid having a natural vibratory frequency of resonance, an electric driver for mechanically vibrating at said natural resonant frequency said system including the contained fluid as a unit, electric pick-up means responding to the vibrations of said system including the fluid, a regenerative circuit connected between the pick-up means and the driver and feeding first, second and third outputs, a frequency discriminator circuit connected to first and second outputs adapted to produce a first output signal which is a function of the deviation of said natural resonant frequency from a predetermined standard frequency, a bridge circuit responsive to the pressure and temperature variations of said fluid and connected wtih said third output and a second discriminator circuit, said second discriminator circuit adapted to produce a second output signal which is a function of deviations of the fluid temperature and pressure from predetermined values, and means responsive to the composite of said first and second output signals to indicate the density of said fluid corrected for any temperature and pressure-induced density variations.

10. Apparatus as set forth in claim 9 in which the indicating means includes a potentiometer across which said second output signal is impressed, said potentiometer having a rotor the positioning of which is a function of the density indicated.

11. Apparatus for measuring the density of fluids comprising a hollow vibratory mechanical system adapted to contain a fluid the density of which is to be determined, said system including a contained fluid having a natural vibratory frequency of resonance, an electric driver for mechanically vibrating at said natural resonant frequency said system including the contained fluid as a unit, electric pick-up means responding to the vibrations of said system including the fluid, a regenerative circuit connected between the pick-up means and the driver and feeding first, second, third and fourth outputs, a frequency discriminator circuit connected to first and second outputs adapted to produce a first output signal which is a function of the deviation of the said natural resonant frequency from a predetermined standard frequency, a bridge circuit responsive to the pressure and temperature variations of said fluid and connected with said third output and a second discriminator circuit, said second discriminator circuit adapted to produce a second output signal which is a function of deviations of the fluid temperature and pressure from predetermined values, a circuit connected to said fourth output adapted to produce a reference signal, a potentiometer across which said second output signal is impressed, said potentiometer having a rotor the positioning of which provides a third output signal which is a function of the rotor positioning and said second output signal, and a motor mechanically connected to a density indicator and said rotor and responsive to any incipient difference between the composite of said first and third output signals and said reference signal whereby the indicator indicates the density of said fluid corrected for any temperature and pressure-induced density variations.

References Cited in the file of this patent

UNITED STATES PATENTS

| | | |
|---|---|---|
| 2,635,462 | Poole et al. | Apr. 21, 1953 |
| 2,689,932 | Hornfeck | Sept. 21, 1954 |
| 2,754,676 | Poole | July 17, 1956 |
| 2,827,787 | Kroeger | Mar. 25, 1958 |